United States Patent
Bohm et al.

(10) Patent No.: US 10,284,646 B2
(45) Date of Patent: May 7, 2019

(54) APPLICATION MULTI-VERSIONING IN A TRADITIONAL LANGUAGE ENVIRONMENT

(71) Applicant: International Business Machines Corporation, Armonk, NY (US)

(72) Inventors: Fraser P. Bohm, Salisbury (GB); John S. Tilling, Chandlers Ford (GB); Matthew A. Webster, Hook (GB); Andrew D. Wharmby, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 14/572,907

(22) Filed: Dec. 17, 2014

(65) Prior Publication Data

US 2016/0179952 A1 Jun. 23, 2016

(51) Int. Cl.

| | |
|---|---|
| *G06F 17/30* | (2006.01) |
| *G06F 9/46* | (2006.01) |
| *H04L 29/08* | (2006.01) |
| *H04L 29/06* | (2006.01) |
| *G06F 9/445* | (2018.01) |

(52) U.S. Cl.
CPC .......... *H04L 67/1097* (2013.01); *G06F 9/445* (2013.01); *H04L 67/42* (2013.01)

(58) Field of Classification Search
CPC ...... G06F 9/466; G06F 9/44536; G06F 9/445; H04L 67/42
See application file for complete search history.

(56) References Cited

U.S. PATENT DOCUMENTS

| | | | | |
|---|---|---|---|---|
| 5,603,027 | A * | 2/1997 | Ohkami | G06F 8/71 707/999.2 |
| 5,974,470 | A * | 10/1999 | Hammond | G06F 9/44521 707/999.202 |
| 6,463,582 | B1 * | 10/2002 | Lethin | G06F 9/45504 717/138 |
| 7,117,371 | B1 * | 10/2006 | Parthasarathy | G06F 21/51 713/187 |
| 7,197,509 | B2 | 3/2007 | Foster et al. | |

(Continued)

OTHER PUBLICATIONS

Appendix P—List of IBM Patents or Patent Applications Treated as Related.

(Continued)

*Primary Examiner* — Usmaan Saeed
*Assistant Examiner* — William P Bartlett
(74) *Attorney, Agent, or Firm* — David B. Woycechowsky

(57) ABSTRACT

Operating an online transaction processing system to perform an application including a first module call by performing the following steps (not necessarily in the following order): (i) assigning a dedicated search path to the application, where the search path specifies an ordered set of location(s) for searching for module code, the set of location(s) includes at least a first dynamic module library and the first dynamic module library is ahead of any other locations which may be included in the dedicated search path; (ii) running the application through the transaction processing system; (iii) receiving the first module call, from the running of the application, specifying a requested module using a requested module name; and (iv) in response to the module call, locating the requested module based on the requested module name and the dedicated search path.

8 Claims, 3 Drawing Sheets

(56) References Cited

U.S. PATENT DOCUMENTS

| | | | |
|---|---|---|---|
| 7,263,700 B1* | 8/2007 | Bacon | G06F 9/445 |
| | | | 707/999.202 |
| 8,738,755 B2 | 5/2014 | Bohm et al. | |
| 2002/0100017 A1* | 7/2002 | Grier | G06F 8/54 |
| | | | 717/120 |
| 2003/0159135 A1* | 8/2003 | Hiller | G06F 9/44536 |
| | | | 717/166 |
| 2006/0059156 A1* | 3/2006 | Janes | G06F 9/449 |
| 2008/0243964 A1* | 10/2008 | Baker | G06F 9/44521 |
| 2009/0138273 A1* | 5/2009 | Leung | G06F 8/34 |
| | | | 705/348 |
| 2009/0187725 A1* | 7/2009 | Mencias | G06F 8/67 |
| | | | 711/171 |
| 2011/0321019 A1* | 12/2011 | Gibbons | G06F 8/433 |
| | | | 717/140 |
| 2014/0033190 A1 | 1/2014 | Fu et al. | |
| 2014/0136711 A1* | 5/2014 | Benari | G06F 9/5061 |
| | | | 709/226 |

OTHER PUBLICATIONS

U.S. Appl. No. 14/842,997 entitled "Application Multi-Versioning in a Traditional Language Environment", filed Sep. 2, 2015.

"The IBM CICS Transaction Server for z/OS, V5.2 open beta offering takes service agility, operational efficiency, and cloud enablement to a new level", IBM United States Software announcement, 214-015, dated Jan. 21, 2014, pp. 1-14, Grace Period Disclosure Document.

\* cited by examiner

APPLICATION MULTI-VERSIONING IN A TRADITIONAL LANGUAGE ENVIRONMENT

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) "The IBM CICS Transaction Server for z/OS, V5.2 open beta offering takes service agility, operational efficiency, and cloud enablement to a new level", IBM United States Software announcement, 214-015, dated Jan. 21, 2014, pp. 1-14.

BACKGROUND OF THE INVENTION

The present invention relates generally to the field of application hosting, and more particularly to application hosting where there are multiple versions of the applications.

One conventional piece of software used in application hosting is called Customer Information Control System (CICS). CICS is a transaction server that runs primarily on certain conventional mainframe computer systems. CICS is middleware designed to support rapid, high-volume online transaction processing. A CICS transaction is a unit of processing initiated by a single request that may affect one or more objects. This processing may be interactive (screen-oriented), or may occur as background transactions. CICS provides services that extend and/or replace functions of an operating system and can be more efficient and simpler than using the generalized services in the operating system, especially in connection with communication with diverse terminal devices.

Applications developed for CICS have been written in a variety of programming languages and use CICS-supplied language extensions to: (i) interact with resources such as files, database connections and terminals, or (ii) to invoke functions such as web services. CICS is currently used by clients such as financial institutions, large commercial enterprises, smaller organizations and government entities. Customers have a huge investment in home-grown or highly customized packaged applications written in traditional languages such as COBOL (common business oriented language), PL/I (programming language one), C, and ASM (assembly language). These applications, when hosted on a middleware platform like CICS, include many, possibly thousands, of individual uniquely named program modules. Duplicate program module names are not permitted which means it is impossible to: (i) host more than one version of an application (where there are common module names which are common to both versions of the application); and/or (ii) host two different applications that have inadvertently chosen the same module names.

In some middleware transaction servers (for example, pre-5.2 versions of CICS), there is only a single directory for module names. In these conventional transaction servers, when a program issued an "EXEC CICS LINK" command (that is, a module call), the target module name was looked up and called if found. If not found in an initial look-up (that is, a look-up in an in-memory cache), then the conventional transaction server will search a "global search path" by searching the following locations in the following order: (i) LPA (link pack area); (ii) dynamic libraries; and (iii) RPL (relocatable program library). These conventional transaction servers then load the first matching module.

The role of dynamic libraries in an application server, implemented by a conventional transaction server, will now be discussed. The primary purpose of a dynamic library, in currently conventional CICS systems, is to allow new datasets to be added to those defined by a data set that is named DFHRPL in the CICS context. However, DFHRPL cannot be modified without restarting CICS. Additionally, if the datasets are defined with a higher ranking than those in DFHRPL programs already loaded can be replaced by newer versions if the SET PROGRAM NEWCOPY or PHASEIN command is used. This mechanism does not allow two or more versions of a program to be explicitly used simultaneously.

SUMMARY

According to an aspect of the present invention, there is a method, computer program product and/or system for operating an online transaction processing system to perform an application including a first module call. The method, system and/or product perform the following steps (not necessarily in the following order): (i) assigning a dedicated search path to the application, where the search path specifies an ordered set of location(s) for searching for module code, the set of location(s) includes at least a first dynamic module library and the first dynamic module library is ahead of any other locations which may be included in the dedicated search path; (ii) running the application through the transaction processing system; (iii) receiving the first module call, from the running of the application, specifying a requested module using a requested module name; and (iv) in response to the module call, locating the requested module based on the requested module name and the dedicated search path.

DETAILED DESCRIPTION

Figure 1:
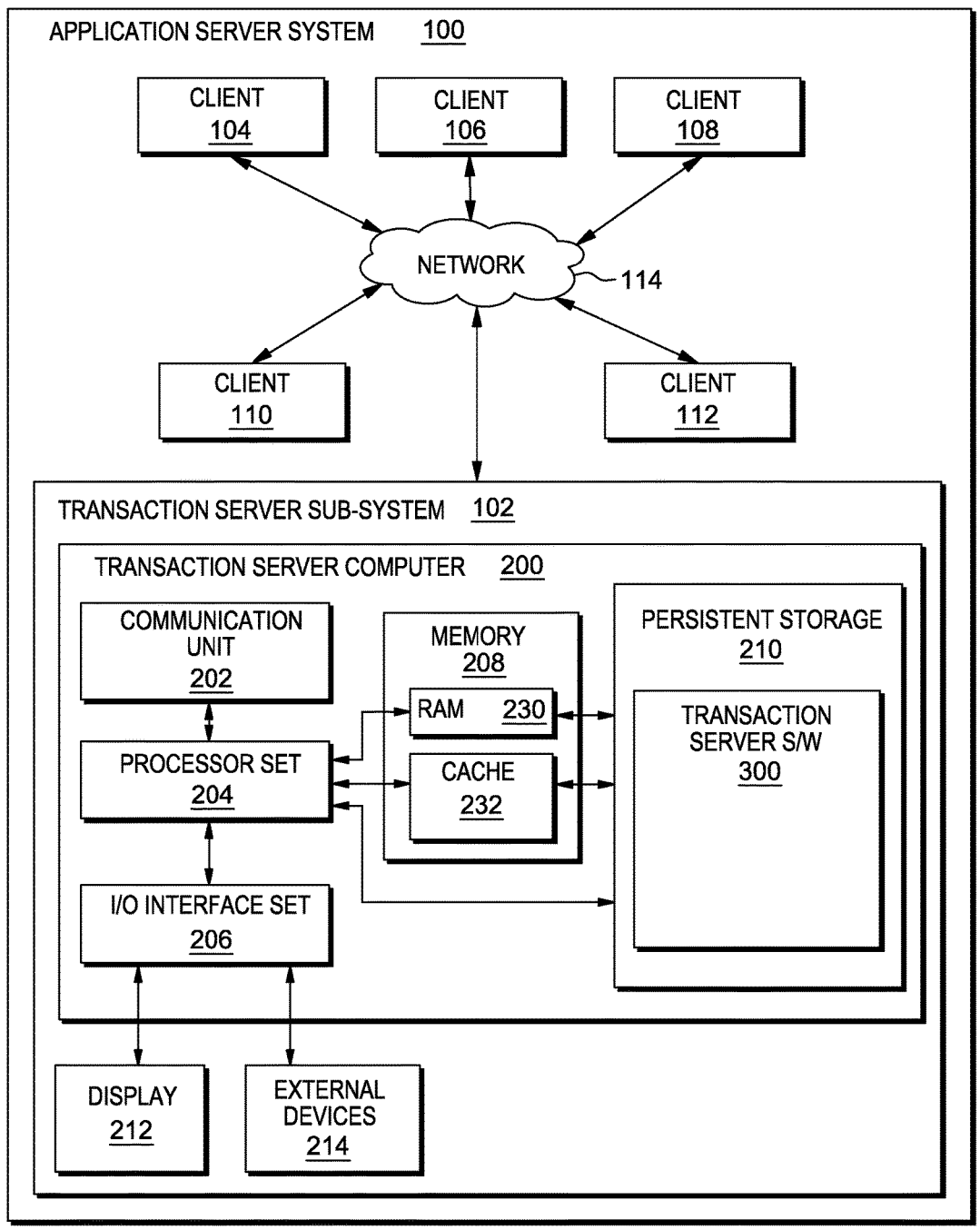
FIG. 1 is a block diagram view of a first embodiment of an application server system according to the present invention.

In some embodiments of the present invention, an online TP (transaction processing) system uses a "dynamic library" (which lists one or more datasets from which modules are loaded). The dynamic library is added to a private search path unique to each application or version of an application. Using the private search path and its referenced dynamic library, an application can define and load modules with the same name (that is, duplicate module names can be used in different applications) as long as the modules are located in different datasets. More specifically, in some embodiments, the private search path is searched before searching the global search path so that the dynamic library will be used to find modules (at least in the first instance), rather than the global search path. In this way, multiple versions of an application can be hosted on the same TP platform without modifying module names or relying on naming indirection. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of application server system 100, including: transaction sub-system 102; client sub-systems 104, 106, 108, 110, 112; communication network 114; transaction server computer 200; communication unit 202; processor set 204; input/output (I/O) interface set 206; memory device 208; persistent storage device 210; display device 212; external device set 214; random access memory (RAM) devices 230; cache memory device 232; and transaction server software 300. In this embodiment: (i) the application server system serves applications to clients 104, 106, 108, 110, 112; (ii) the transaction server is hosted on a single physical computer (in other embodiments it may be spread among and between multiple physical and/or virtual machines); and (iii) transaction server software 300 is, or includes, middleware.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Software 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Software 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Software 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
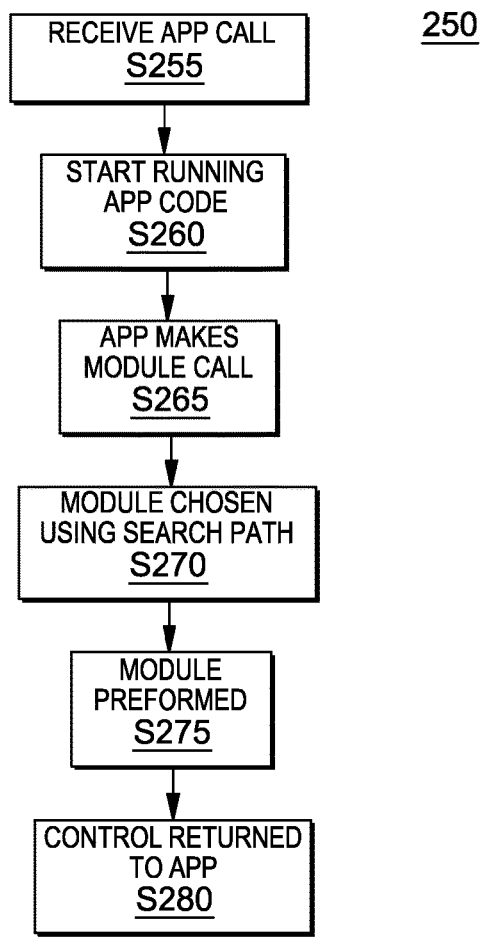
FIG. 2 is a flowchart showing a first embodiment method performed, at least in part, by the first embodiment system.
Figure 3:
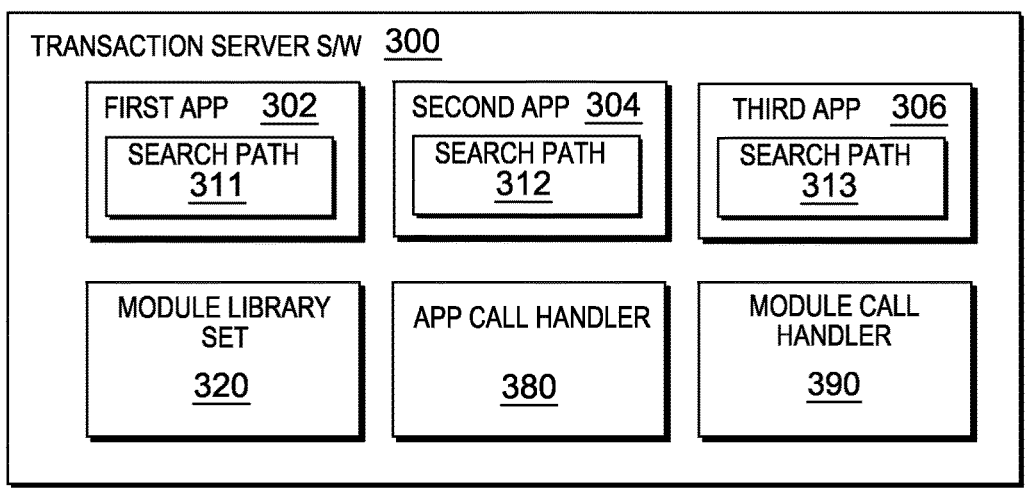
FIG. 3 is a block diagram view of a machine logic (for example, software) portion of the first embodiment system.
Figure 4:
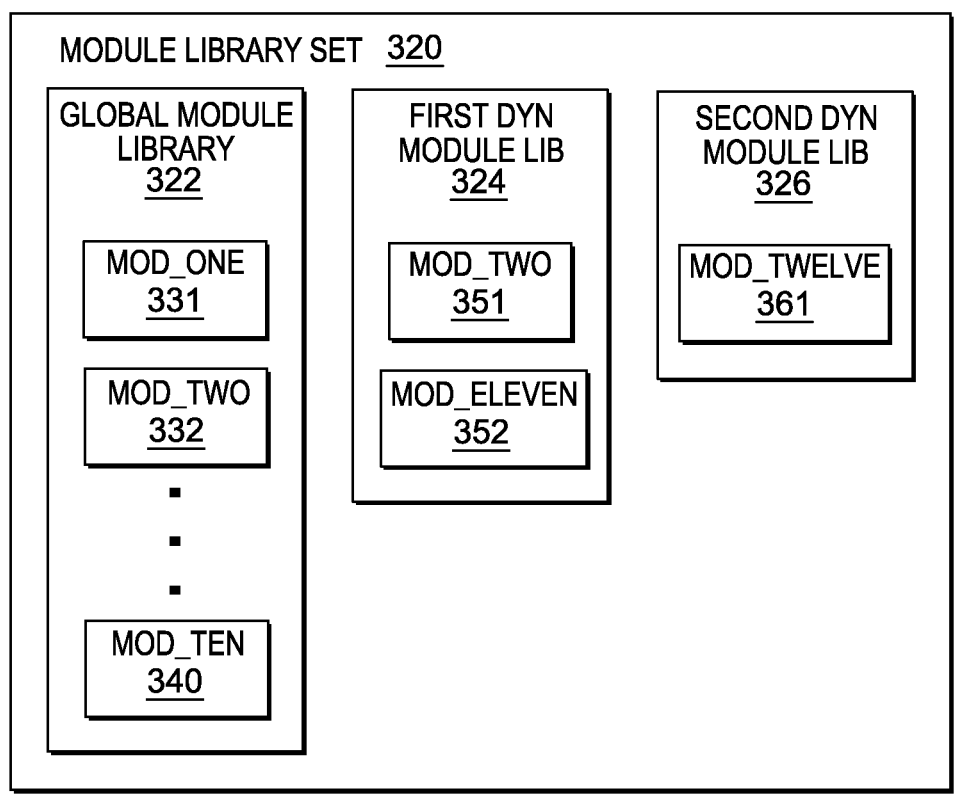
FIG. 4 is another block diagram view of a machine logic (for example, software) portion of the first embodiment system.

FIG. 2 shows flowchart 250 depicting a method according to the present invention. FIGS. 3 and 4 shows software 300 (and constituent portions thereof) for performing at least some of the method steps of flowchart 250. This method and associated software will now be discussed, over the course of the following paragraphs, with extensive reference to FIG. 2 (for the method step blocks) and FIGS. 3 and 4 (for the software blocks).

Processing begins at step S255, where application ("app") call handler 380 of transaction server software 300 receives an application call from client sub-system 104 (see FIG. 1) to run an application called "second application," which is denominated as second app 304 in FIG. 3. This application call of step S255 is made in a manner that is currently conventional for calling applications from an application server, implemented as a middleware transaction server, and will not be discussed in detail here.

Processing proceeds to step S260, where processor(s) in application server system 100 (for example, processor set 204) begin running the application code for second app 304 pursuant to the application call previously received at step S255. As part of running the application code, code for the search path 312 is used to set up the way in which module calls will be handled as the application continues to run. In this case, search path 312 of second app identifies the following locations to be searched, upon module calls, in the following order: (i) (i) second dynamic module library 326; (ii) first dynamic module library 324; (iii) global module library 322; (iv) LPA (link pack area); and (v) RPL (relocatable program library). As the terms "dynamic library," and "non-dynamic library," are used in this document: (i) a "dynamic library can be modified without re-starting the transaction server; and (ii) a "non-dynamic library" cannot be modified without a restart of the transaction server (DFHRPL in CICS is an example of a non-dynamic library").

Processing proceeds to step S265, where module call handler 390 receives a module call from second application 304 as second application 304 continues in its execution. More specifically, second app 304 calls a module named "MOD_TWO." In this embodiment, all of the modules for all of the applications, collectively, are stored in module library set 320 of transaction server software 300 (see FIGS. 3 and 4). More specifically: (i) global module library includes modules named MOD_ONE 331, MOD_TWO 332, MOD_THREE, MOD_FOUR, MOD_FIVE, MOD_SIX, MOD_SEVEN, MOD_EIGHT, MOD_NINE, and MOD_TEN 340; (ii) first dynamic module library 324 includes modules named MOD_TWO 351 and MOD_ELEVEN 352; and (iii) second dynamic module library 326 includes a single module named MOD_TWELVE 361.

As can be seen from the foregoing lists of the previous paragraph, there are two modules named MOD_TWO, specifically: (i) MOD_TWO 332 of the global module library; and (ii) MOD_TWO 351. These are different modules that perform different functions, but they happen to have the same name. In conventional systems, this would be a problem, and (assuming the conventional system even allowed two different modules to be named MOD_TWO), the wrong MOD_TWO might be run when second app 304 calls "MOD_TWO" at step S265. As will be discussed in connection with the next step of flowchart 250, this embodiment of the present invention prevents this problem.

Processing proceeds to step S270, where module call handler 390 uses search path 312 of second app 304 to determine the order in which the various libraries of module library set 320 will be searched for the called module "MOD_TWO." As stated above, search path 312 specifies that second dynamic module library 326 is to be the first location checked when a module is called. In this embodiment, the second dynamic module library was created specifically for second app 304, and includes MOD_TWELVE 361, which is used in second app 304, and in no other. MOD_TWELVE 361 could have been placed, alternatively, or additionally in global module library 322 and/or first dynamic module library 324, but, in this example, the system designers chose to put MOD_TWELVE only in the second dynamic module library (perhaps to avoid future name conflicts in the global library).

However, MOD_TWELVE has not been called-rather, MOD_TWO has. Because no module named "MOD_TWO" is present in the library 326, the next library on search path 312 of second app 304 is next checked, specifically first dynamic library 324. In this example: (i) second app 304 is a later version of first app 302 (which includes search path 311); (ii) first app 302 and second app 304 share much functionality and much code; (iii) first dynamic library 324 was originally created to store modules (especially name-conflicted modules) designed for use in first app 302; (iv) MOD_TWO (as it exists in first dynamic library 324) is a name-conflicted module that was originally designed for use with first app 302; and (v) MOD_ELEVEN 352 is a non-name-conflicted module that was originally designed for use with first app 302. In this example, first dynamic module library 324 is the second location on search path 312 of second app 304 because second app 304 is closely related to first app 302 that it is likely to (and indeed does) include modules needed to properly run second app 304. Accordingly, module call handler locates MOD_TWO 351, which is the correct MOD_TWO (unlike MOD_TWO 332 in global module library 322), and causes MOD_TWO 351 to begin to be performed pursuant to the module call of step S265. Processing proceeds to step S275, where performance of MOD_TWO 351 is completed.

This use of dynamic libraries is different than the conventional "indirection" process (described above in the Background section) because under at least some embodiments of the present invention, this process is only used the first time a load module is called after which it is cached in memory (that is, 232) and a directory used to map its name to a pointer in that cache. Large applications comprising many load modules are typically loaded "lazily" to ensure a fast startup and reduce memory footprint. In this way, under some embodiments of the present invention, not every load module is required to satisfy each client request and a load module can: (i) remain on disk; or (ii) even be flushed from the cache if not used for a certain period of time or when memory becomes exhausted.

Processing proceeds to step S280, where control is returned to second app 304 (at least until further module calls are made by second app 304). As a final note, it is noted that not every app will necessarily have its own dynamic module library. For example, third app 306 does not have an associated dynamic module library, and, accordingly, its search path 313 specifies global module library 322 as its only library for its module calls.

III. Further Comments and/or Embodiments

Some embodiments of the present invention recognize that application hosting environments where duplicate module names are not permitted can lead to troublesome consequences, such as: (i) re-writing or restructuring mission-critical applications in order to avoid duplicate module names is expensive and risky because changing the name of a given module means finding and changing all code segments that call that module; and/or (ii) frequent and reliable update of an application is required to stay current with fixing bugs and with emerging user technologies (such as mobile versions of applications served by the application hosting system), but these updates lead to multiple versions of an application.

Some embodiments of the present invention further recognize the following potential problems with respect to customers adopting solutions to host multiple applications with "conflicting" (that is, duplicate) module names: (i) renaming the updated modules is time consuming; (ii) renaming the updated module carries the risk of not identifying all the callers of the module concerned; (iii) in highly performance sensitive environments, changes to existing code is required when a directory is used to map the name (this is called "naming indirection") rather than calling a module directly; (iv) in highly performance sensitive environments, imposed runtime overhead is required when naming indirection, rather than direct module calling, is used; and/or (v) hosting a new application version on a new CICS platform, in order to avoid duplicate module naming, is expensive in terms of human and/or computing resources.

In one embodiment of the present invention, a transaction server: (i) runs on a mainframe computer system; (ii) is implemented by "middleware;" (iii) is designed to support rapid, high-volume online transaction processing; and (iv) includes dynamic libraries. Each dynamic library identifies sets of data (herein called "datasets") from which modules are to be loaded as an application is run and modules are called in the running of the application. The dynamic libraries are not added to the global search path, at least in cases where a given dynamic library defined as part of an application. Instead, a given dynamic library is added to a private search path. A dynamic library and its associated private search path may be shared by more than one application (or more than one version of an application) so long as the applications (or versions) do not use the same module name inconsistently.

In this embodiment, when running a version of an application through the transaction server, upon a module call by the application, the dynamic library specified in the private search path of the application is searched before the global path.

This allows different applications (or versions) to define and load modules: (i) with the same name, but (ii) located in different datasets. Once in memory, a module can only "see" and "call" a module defined by the same application. Certain modules can be marked as entry points and promoted to the global namespace so applications can call each other.

Some embodiments of the present invention may include one, or more, of the following features, characteristics and/or advantages: (i) allows multiple versions of the application to be hosted on the same transaction server (for example, CICS) platform without modifying module names; (ii) allows multiple versions of the application to be hosted on the same transaction server platform without relying on naming indirection; (iii) application development remains unchanged; (iv) application deployment remains unchanged; and/or (v) significant cost savings can be realized if multiple versions of an application must be made available, at the same time, to end users.

In some embodiments of the present invention, the transaction server's directory is partitioned into both public and application private areas. Before performing a lookup of a called module, the transaction server first retrieves the current application context from the task and searches the application-private directory and dataset search path before proceeding to the public one. The current application context is set when an entry point is: (i) invoked; (ii) stacked when a second application entry point is invoked; and/or (iii) cleared when a public module is called.

Some embodiments of the present invention concern or involve the configuration of the middleware so that existing software components (program load modules) can be used unchanged to represent different versions of a service.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer program product comprising: a machine readable storage device; and computer code stored on the machine readable storage device, with the computer code including instructions for causing a processor(s) set to perform operations including the following:

partitioning a transaction server directory into a global search path area and a plurality of private search path areas, with the plurality of private search areas including: (i) a first private search path area corresponding to a first application, and (ii) a second private search path area corresponding to a second application, receiving a first module for invocation by a first application while running in a first application context in a transaction server, naming the first module to have a first module name, adding the first module name to a first dynamic library located in the first private search path area and locatable by a first private search path associated with the first application, without adding the first module name to a global search path associated with the transaction server at a transaction server level, receiving a second module for invocation by a second application while running in a second application context in the transaction server, naming the second module to have the first module name, adding the first module name to a second dynamic library located in the second private search path area and locatable by a second private search path associated with the second application, without adding the first module name to a global search path associated with the transaction server at a transaction server level, invoking an entry point for the second application, responsive to the invocation of the entry point for the second application, setting a current application context to be indicative of the second application, calling, by the second application, a module having the first module name, and performing a lookup of the first module name in the second private search path area based upon the setting of the current application context as indicative of the second application, wherein the computer program product represents an improvement in computer technology because it allows for duplicate module names for modules in a transaction sever directory in a transaction server implemented by middleware.

2. The computer program product of claim 1 wherein the computer code further includes instructions for causing the processor(s) set to perform the following operations:

calling a public module;

responsive to the calling of the public module, clearing the current application context; and looking up the public module from the global search path in the global search path area.

3. The computer program product of claim 1 wherein the first and second applications are versions of a CICS (Customer Information Control System) platform application that are both hosted on a common transaction server.

4. The computer program product of claim 1 wherein the computer code further includes instructions for causing the processor(s) set to perform the following operations:

promoting the first module to a global namespace by:
marking the first module as entry point, and
adding the entry point to the global search path of the transaction server.

5. A computer system comprising: a processor(s) set;
a machine readable storage device; and
computer code stored on the machine readable storage device, with the computer code including instructions for causing the processor(s) set to perform operations including the following:

partitioning a transaction server directory into a global search path area and a plurality of private search path areas, with the plurality of private search areas including: (i) a first private search path area corresponding to a first application, and (ii) a second private search path area corresponding to a second application, receiving a first module for invocation by a first application while running in a first application context in a transaction server, naming the first module to have a first module name, adding the first module name to a first dynamic library located in the first private search path area and locatable by a first private search path associated with the first application, without adding the first module name to a global search path associated with the transaction server at a transaction server level, receiving a second module for invocation by a second application while running in a second application context in the transaction server, naming the second module to have the first module name, adding the first module name to a second dynamic library located in the second private search path area and locatable by a second private search path associated with the second application, without adding the first module name to a global search path associated with the transaction server at a transaction server level, invoking an entry point for the second application, responsive to the invocation of the entry point for the second application, setting a current application context to be indicative of the second application, calling, by the second application, a module having the first module name, and performing a lookup of the first module name in the second private search path area based upon the setting of the current application context as indicative of the second application, wherein the computer system represents an improvement in computer technology because it allows for duplicate module names for modules in a transaction sever directory in a transaction server implemented by middleware.

6. The computer system of claim 5 wherein the computer code further includes instructions for causing the processor(s) set to perform the following operations:

calling a public module;

responsive to the calling of the public module, clearing the current application context; and looking up the public module from the global search path in the global search path area.

7. The computer system of claim 5 wherein the first and second applications are versions of a CICS (Customer Information Control System) platform application that are both hosted on a common transaction server.

8. The computer system of claim 5 wherein the computer code further includes instructions for causing the processor(s) set to perform the following operations:

promoting the first module to a global namespace by:
marking the first module as entry point, and adding the entry point to the global search path of the transaction server.

* * * * *